United States Patent Office

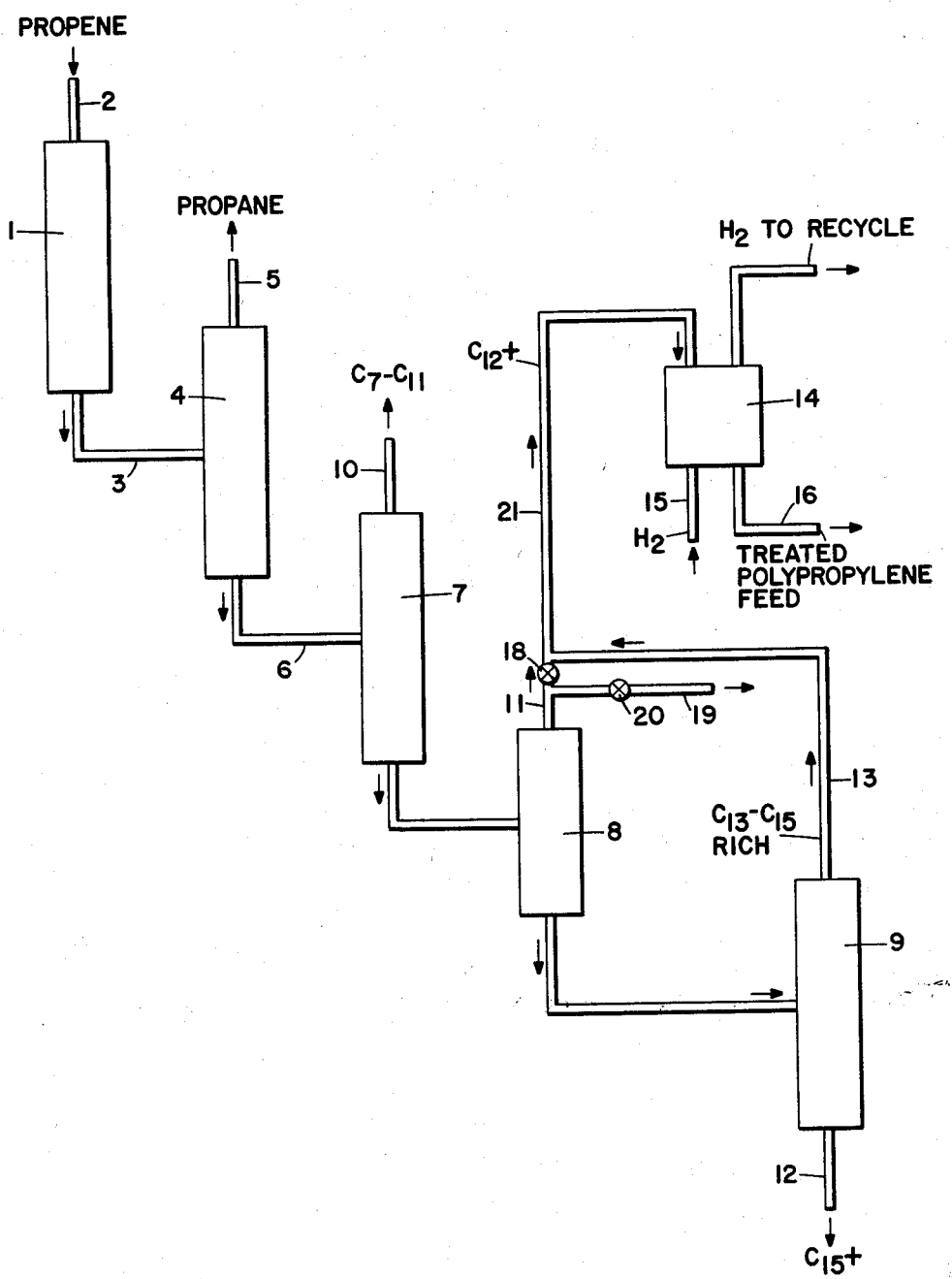

2,943,119
Patented June 28, 1960

2,943,119

PREPARATION OF IMPROVED OLEFIN ALKYLATION FEEDS

William Henry Jones, Baton Rouge, La., assignor to Esso Research and Engineering Company, a corporation of Delaware Filed May 8, 1958, Ser. No. 733,912

10 Claims. (Cl. 260—671)

This invention relates to the preparation of improved olefin alkylation feeds for use in the preparation of alkyl aryl compounds known as detergent alkylates. More specifically, this invention relates to the treatment of $C_9$–$C_{24}$, especially $C_{12}$–$C_{15}$, polypropylene olefins by the selective removal of small amounts of alkylation inhibiting components. Still more specifically, this invention relates to the treatment of $C_{12}$ or tetrapropylene rich fractions prepared by the polymerization of propylene in the presence of a phosphoric catalyst to remove selectively small amounts of materials which have inhibiting effects, whereby lesser amounts of alkylation catalyst are required in the reaction of the tetrapropylene with benzene.

By tetrapropylene, tetramer, or $C_{12}$ polypropylene fraction is meant a propylene polymer fraction generally boiling in the range of about 340 to 430° F. Such a fraction will usually contain mainly $C_{12}$ polymers with lesser amounts of lower and higher boiling polymers.

This invention preferably comprises the selective mild hydrogenation treatment of tetrapropylene feed stocks without substantial hydrogenation of the olefin polymers to form a superior olefin alkylation feed and the preparation of the $C_{12}$ alkyl benzene. In the synthetic detergent field water-soluble alkyl aryl sulfonates are a commercially acceptable product in today's market and this type of detergent accounts for well over 60% of all synthetic detergents produced. These anionic alkyl aryl sulfonates compete not only with soap but with various other anionic detergents such as the fatty acid sulfates, non-ionic detergents such as the alkyl aryl polyether or the fatty acid polyether types and cationic detergents such as the quaternary ammonium compounds.

The alkyl aryl sulfonates which are the end products of the intermediates produced by the present invention are generally prepared by alkylating an aromatic with the olefins in the presence of the Friedel-Crafts catalyst $AlCl_3$. Initially there has been employed a catalyst sludge layer which in prior art processes required $AlCl_3$ make-up as high as 6 to 7 wt. percent based on tetramer feed. The alkyl benzene is subsequently reacted with sulfuric acid to form a sulfonic acid which is neutralized with caustic to form the finished sodium alkyl benzene sulfonate. This sulfonate detergent in commercial practice is of course combined with various detergent builders such as sodium sulfate, carboxymethyl cellulose, various sodium phosphates and the like.

The monoolefins employed as feed in the preparation of the alkylate are preferably a tetrapropylene fraction or $C_{12}$ olefin rich fraction although $C_9$–$C_{24}$ polypropylenes may be used. The polypropylenes are prepared in a polymerization plant which comprises a reactor packed with phosphoric acid on Kieselguhr or other conventional carriers. Generally the phosphoric acid is present in amounts of 50 to 90 wt. percent calculated as $P_2O_5$. As feed for the polymerization plant it is preferable to employ light gaseous olefin which is predominantly propylene. By carrying out the reaction with propylene the tetramer is produced as a byproduct of gasoline manufacture by fractionation of the polymer product. Occasionally it is also desirable to produce $C_7$ olefins in substantial quantities as oxo feed stocks and the like and in this case small amounts of butylenes are added to the polymerization plant feed. It is to be understood that the polymer product comprises a smear of various olefins having from about 6 to 24 carbon atoms per molecule and of course the olefins so produced vary in branchiness, generally from a monoalkyl substituted olefin to highly branched products in the case of high molecular weight olefins. In general the propylene feed is passed into the reactor at the rate of 0.05 to 1 gallon per hour per pound of catalyst and the polymerization reactor is maintained at temperatures between 250 to 600° F. and at pressures of 200 to 2000 p.s.i.g. or higher. A typical polymerization product will comprise tetramer in an amount from 10 to 25 volume percent on total polymer. This general process is well known in the art and usually referred to as U.O.P. polymerization. The particular tetramer fraction employed is essentially one of choice depending on its effect on the detergent product; however a typical suitable tetrapropylene fraction which may be employed to produce extremely desirable alkyl benzene products will have a boiling range of, for example, from 210° to 260° F. at 50 mm. Hg.

The polypropylene thus produced is then reacted with benzene or similar aromatics in the presence of $AlCl_3$. One of the most suitable commercial processes comprises the use of $AlCl_3$ in the form of a dispersion or sludge with high molecular weight hydrocarbons. In order to produce selectively a high percentage of monoalkyl benzene compounds as compared with di- and polyalkylated benzene a high ratio of benzene to olefin feed, e.g. tetrapropylene, is employed. These ratios may be in the range of from 2 to 20:1 of benzene to tetramer.

The alkylated benzene is then fractionated into a light alkylate, heavy alkylate and detergent alkylate. The detergent alkylate may have a boiling range of, for example, 415° to 610° F., although this may vary depending on the particular specifications of the various detergent manufacturers.

An important cost factor to the manufacturer of alkylated benzene is the amount of $AlCl_3$ catalyst that is required to catalyze the reaction. It is a primary object of this invention to provide an improved polypropylene feed stock for this alkylation reaction whereby the amount of alkylation catalyst required is substantially decreased over prior art processes. It is a further object of this invention to provide a process for the preparation of alkyl benzene suitable for detergent manufacture wherein relatively small quantities of alkylation catalyst are required.

It has now been found that the polypropylenes and especially tetrapropylene fraction employed for the alkylation of benzene may at times contain amounts of inhibiting materials which decrease the efficiency of the $AlCl_3$ catalyst to a substantial extent. The inhibiting materials have been found difficult to identify. Their effect, however, is shown by decreased yield of alkylate per unit weight of $AlCl_3$ catalyst used.

An especially desirable and preferred method for the removal of the alkylation inhibiting components comprises the mild treatment of the polypropylenes with hydrogen in the presence of a selective hydrogenation catalyst such as platinum supported on silica gel. The occasional presence of inhibiting materials is difficult to account for because various chemical treatments and tests have not suitably isolated or detected these components.

For the purpose of describing the invention with more clarity reference will now be had to the drawing which shows a simplified flow plan of detergent alkylate manufacture starting from the production of tetrapropylene. A specific embodiment will now be given with reference to the drawing. Fresh propylene feed after being caustic and water washed to remove impurities is passed into the primary polymerization reactor 1 via line 2. Reactor 1 is preferably packed with a phosphoric acid catalyst on kieselguhr comprising 75% by weight phosphoric acid calculated as $P_2O_5$. Generally the propylene feed will comprise substantial amounts of propane, e.g. 40 to 60 mole percent. The polymer comprising olefins from 6 to 24 carbon atoms is withdrawn from reactor 1 via line 3 and passed first to a depropanizer 4 where propane is removed via line 5. Reactor 1 is maintained at about 400° F. and 675 p.s.i.g. with a flow rate of 0.25 gallon per hour total feed per pound of catalyst. The total polymer is then removed from the depropanizer via line 6 and passed through a series of fractionating towers 7, 8 and 9 for the recovery of light polymer, e.g. $C_7$–$C_{11}$, via line 10, a tetramer rich fraction via line 11 and high molecular weight polymer via lines 12 and 13. A relatively high boiling portion of what constitutes the tetramer rich fraction, i.e. a portion containing more of the $C_{13}$–$C_{15}$ propylene polymers may be collected with the $C_{12}$ polymers or be recovered as a separate fraction taken from tower 9 by line 13. All or portions of the tetramer rich fraction in accordance with this invention may then be passed by line 21 to a hydrofining zone 14 packed with or containing a catalyst comprising 2 wt. percent platinum on silica gel. If only the higher boiling olefin polymers from tower 9 are to be given the hydrofining treatment, they may be sent to zone 14 via line 13, and the lower boiling $C_{12}$ rich portion of the tetramer fraction may be withdrawn by closing valve 18 and withdrawing this portion through line 19 with its valve 20 open. The conditions within the selective hydrogenation tower 14 may vary between 40° to 500° F., e.g. 80° F., and 0 to 100 p.s.i.g., e.g. 25 p.s.i.g., with a residence time of 5 to 250 minutes, e.g. 80 minutes. The hydrogen gas is admitted via line 15. The hydrofined product now substantially improved in alkylating quality is then passed via line 16 to a conventional alkylation plant, not shown, and the alkylation products are treated, if desired, and fractionated to recover the desired alkylate fractions.

It is to be understood that the above described process for the production of polypropylene is in simplified form and may comprise various recycle streams and additional purifying treatments and distillation stages throughout the process. Although the preferred technique for improving the quality of the polypropylenes is selective hydrofining with platinum on silica, silica-alumina, alumina, kieselguhr, charcoal or other carriers, various other selective hydrogenation catalysts may be employed. Generally the platinum or other active hydrogenating metal component of the catalyst is employed in an amount of from 0.5 to 10 wt. percent based on the carrier. Ratios outside of this range may be used if desired. Other catalysts, e.g. nickel, palladium or the like, which may be supported or unsupported on conventional carriers such as described above as desired, may be used. Preferably, the selective treatment is carried out in liquid phase. However if desired vapor phase reaction of the desired catalyst may be employed. In general, any of the highly active catalysts that function at low temperatures below 500° F. with low hydrogen pressures may be used, insofar as their use for the treatment does not effect a substantial amount of change in the olefin polymers, such as cracking or saturation of the ethylenic double bond.

The alkylation stage may be a conventional one employing a $C_{12}$ olefin (tetramer) to benzene ratio of 1:2 to 20, e.g. 1:8, at a temperature of 40° to 80° F., e.g. 55° F., and a pressure of 0 to 75 p.s.i.g., e.g. 20 p.s.i.g. There are of course many details concerning alkylation processes which need not be discussed herein since the invention relates primarily to the treatment of the polypropylene feed derived from the U.O.P. polymerization process and no novelty is ascribed to any particular alkylation technique other than the use of the improved olefin feed of this invention. The above conditions represent preferred conditions and may be altered slightly to suit the needs of any particular plant design. For further detailed and general information as to the alkylation process per se reference may be had to the patent issued to W. J. Paltz, U.S. 2,667,519.

To determine the effectiveness of the treatment for eliminating undesired inhibiting effects, a test showing the amount of alkylate formed with measured amount of catalyst under comparative conditions is used. The relative efficiencies of the reaction can then be compared to arrive at figures which denote the relative merit of the polymer for alkylation. These figures agree with the efficiencies of alkylation on large plant scale operations.

A series of tests were made on a tetramer fraction which needed improvement and on the portions of said fraction improved by the hydrofining treatment of the present invention. In the treatments, checks were made on temperatures and time for similar amounts of hydrogenation catalysts. The hydrogen was bubbled up through the tetramer in the presence of the catalyst specified. Each sample of tetramer given a hydrofining treatment and the control sample given no treatment was separately reacted with benzene used in the same proportion and measured amounts of catalyst to determine the relative extent of alkylation obtained per gram of the catalyst. The following table shows the results:

Table I

| Treatment of Tetrapropylene At Atmospheric Pressure | | | Alkylation Merit |
|---|---|---|---|
| Catalyst | Temp., °F. | Minutes | Relative Extent of Alkylation, Percent Per Gram of $AlCl_3$ |
| No treatment, original tetramer prepared in accordance with the example above | | | 19.2 |
| 2% Platinum on Silica Gel | 80 | 10 | 27.8 |
|  | 80 | 30 | 30.3 |
|  | 80 | 30 | 35.7 |
|  | 80 | 60 | 37.0 |
| 2% Platinum on Alumina | 80 | 80 | 28.6 |
| Nickel | 210 | 80 | 26.4 |
| Adams Catalyst (Platinum Black) | 80 | 240 | 23.2 |
|  | 210 | 120 | 21.7 |

The following tests were made on a continuous hydrofining unit and relative merits of the products were determined in the manner described.

Table II

[Tetrapropylene fraction (19.2% merit untreated), 375 p.s.i.g. pressure; 0.5 v./v./hr. feed rate selective hydro. catalyst 70% nickel on kieselguhr packed in tower.]

| Temperature, °F. | Hydrofined Tetramer Merit, Percent |
|---|---|
| 300 | 31.3 |
| 215 | 31.3 |

The test results in Table I and Table II show that the moderate hydrofining treatment gave the desired improvement in the product quality polypropylene fractions as indicated by the relative increase in alkylation obtained per unit amount of the catalyst, using the active hydrogenation catalyst under mild conditions, preferably temperatures in the range of 80 to 300° F. The amount of hydrogen consumed was very small. This is confirmed by the fact that mass spectrometer analysis did not show any marked difference between the tetramer fraction components before and after hydrofining. The total olefin composition of the $C_8$ to $C_{15}$ olefins remained substantially unchanged. There was no substantial change in other components present, nor substantial formation of saturated hydrocarbons.

Studies were made on miscellaneous chemical treatments of the tetramer fractions with various acids, e.g. $H_2SO_4$, $H_3PO_4$, phenol plus 2% $H_2SO_4$, adsorbent clays, e.g. Attapulgus, diatomaceous earth, silica gel, sodium, etc., but the results obtained showed little or no improvement in the treated tetramer quality over the untreated tetramer. The treatments were carried out with the treating agents using vigorous stirring, various temperatures, also, with different degrees of severity as to the concentrations. These tests and various analyses show that it is difficult to ascribe the inhibiting effect to any particular kind of compound, such as a diolefin, a cyclical olefin, or sulfur-containing olefin. Such contaminants are present in very small amounts and would be removed by the chemical treatments mentioned. There is a drawback in using any of the chemical treatments, other than the mild hydrofining, in that they may introduce new contaminants formed by reaction, e.g. saturates, higher polymers and oxygenated hydrocarbons.

While, in general, there is no correlation between the overall boiling range and quality of tetramer fractions, it has been found that the high boiling portion of a tetramer fraction may need the improvement in quality more than the lower boiling portion. By the high boiling portion is meant the last 30 to 40% which is distilled. For example, starting with a tetramer fraction having a tetramer merit of 19.2% as shown in Table I, the higher boiling 35% portion of this fraction tends to have a merit rating which is somewhat lower, on the average between 12% and 19%. Accordingly, in recovering a tetramer fraction from the propylene polymerization reaction, the high boiling components amounting to about one-third of the total tetramer rich fraction, can be collected as a separate fraction or stream, then be subjected to the hydrofining for upgrading its quality and thereby economizing on the amount of material treated. Following the treatment of a portion of the polymers, the resulting hydrofined product can be reblended with the lower boiling polymer components.

It is recognized that the propylene polymer may be formed from propylene fractions which contain varying minor amounts of normal butylenes but preferably with relatively small amounts of isobutylene. However, the presence of the butylenes has not been found to essentially form the inhibiting components.

From the difficulty of identifying the kind of inhibitor or catalyst deactivating substance, which would be present in an extremely small amount, it may be considered that such substance is very potent or may be in the form of a precursor which is very reactive and undergoes a change during the alkylation to form the catalyst deactivating material.

Samples of $C_{12}$ rich propylene polymers were made so as to contain a specific amount of cyclic olefins and diolefins, then analyzed by low voltage mass spectrometry (M.S.) and infra-red analyses before and after hydrofining. These analyses showed no marked or substantial difference before and after hydrofining over platinum on $SiO_2$ catalyst at 80° F. for 30 minutes. This is illustrated by the following tabulation:

Table III

| | Before Treatment | After Hydrofining |
|---|---|---|
| Sample | A | B |
| Alkylation Merit, percent | 19.2 | 35.7 |
| M.S. Analysis—Total Olefin Basis Olefins ($C_nH_{2n}$): | | |
| $C_{15}$ | 2.5 | 3.3 |
| $C_{14}$ | 5.6 | 5.7 |
| $C_{13}$ | 12.1 | 12.2 |
| $C_{12}$ | 61.1 | 59.8 |
| $C_{11}$ | 9.5 | 9.3 |
| $C_{10}$ | 1.8 | 2.0 |
| $C_{8-9}$ | 1.2 | 1.4 |
| Total | 93.8 | 93.7 |
| Cyclic Olefins or Diolefins ($C_nH_{2n-2}$): | | |
| $C_{15}$ | 1.0 | 0.8 |
| $C_{14}$ | 1.3 | 1.5 |
| $C_{13}$ | 1.7 | 1.7 |
| $C_{12}$ | 2.2 | 2.3 |
| Total | 6.2 | 6.3 |
| Hydrogen Content, Wt. Percent | 14.19 | 15.25 |

The analyses showed that practically within limits of possible error, the change by the hydrofining in olefin content was substantially nil and not substantial, i.e., no more than about 1%, and the hydrofining treatment improved the quality of the sample greatly in its alkylation merit (yield of alkylate per gram of catalyst). A bromine number test on both samples showed a slight but not a marked difference from about 112 for sample A to about 98 for sample B, considering that the bromine number determined involves experimental errors and is changed notably by amount of unsaturation and also by other slight changes in molecular weight and reactivity due to slight changes in structure.

The polypropylenes may contain in addition to the olefinic hydrocarbons a small amount of paraffins and naphthenes formed in the polymerization process. Analyses showed that the hydrofining did not make any substantial increase in naphthene content, showing that cyclic olefins were not necessarily saturated to a substantial extent to improve the alkylation quality. These and other studies on the effects of the hydrofining show that the amount of hydrogen chemically absorbed by the feed during the treatment can be kept down to from 0.1 to 0.6% by weight in making a desired 50 to nearly 100% improvement in alkylation quality of the polypropylenes. For example, for a polypropylene fraction having a calculated and analyzed hydrogen content of 14.0 to 14.2%, the hydrofining made the hydrogen content less than 1% higher, preferably so that the hydrofined product had a hydrogen content of about 14.20 to 14.40%, preferably 14.25 to 14.35 wt. percent, although even if the hydrogen content is higher, e.g., up to 15.35%, the feed is suitable for alkylation.

It will be noted that in the hydrofining a small amount of paraffins or naphthenes could be formed; however, to some extent these saturated hydrocarbons are conveniently removed during the fractional distillation of the alkylate, especially when the alkylate fraction is taken at cut points to eliminate the relatively lower boiling paraffins and naphthenes.

This application is a continuation-in-part of Serial Number 659,336, filed May 15, 1957, now abandoned.

What is claimed is:

1. In a method of alkylating benzene by the reaction of a fraction containing polypropylenes in the $C_9$–$C_{24}$ range with benzene in the presence of aluminum chloride catalyst, the improvement which comprises hydrofining said fraction without substantial change in its monoolefin content and employing said treated fraction to prepare alkyl benzene in the presence of aluminum chloride catalyst.

2. A method in accordance with claim 1 wherein said hydrofining is carried out with an active hydrogenation catalyst at low temperatures and hydrogen pressures to slightly increase the hydrogen content of the feed stock and to obtain less than about 1% change in the monoolefin component content of the feed stock.

3. A method in accordance with claim 2 wherein said hydrogenation catalyst is platinum on a silica containing base.

4. A method in accordance with claim 2 wherein said hydrogenation catalyst is nickel supported on a silica containing base.

5. A method in accordance with claim 2 wherein said hydrofining is carried out at temperatures below 500° F. and pressures of about 0 to 100 p.s.i.g.

6. A method in accordance with claim 2 wherein said hydrofining is carried out at temperatures in the range of 80° to 300° F. and the absorption of hydrogen by the feed stock is kept below 0.6% by weight.

7. In the method of claim 1, hydrofining said fraction to increase its hydrogen content from below 14.2 wt. percent to within the range of 14.25 and 15.35 wt. percent.

8. In a method of preparing alkyl benzene wherein a $C_{12}$–$C_{15}$ polypropylene rich fraction is reacted with an excess of benzene in the presence of an aluminum chloride catalyst, the improvement which comprises hydrofining said $C_{12}$–$C_{15}$ polypropylene feed to slightly increase its hydrogen content without substantial change in its monoolefin content, then contacting the treated polypropylene fraction with excess benzene in the ratio of 1:2 to 20 at 40° to 80° F. and a pressure of 0 to 75 p.s.i.g. in the presence of an aluminum chloride catalyst.

9. A method in accordance with claim 7 wherein said polypropylene fraction is tetrapropylene rich fraction and in which the monoolefin content is changed by less than 1% by weight based on the total olefins.

10. In the alkylation of benzene by the reaction of tetrapropylene feed prepared by polymerizing propylene in the presence of a phosphoric acid catalyst with benzene in the presence of $AlCl_3$ alkylation catalyst, the improvement which comprises separating a fraction of the polypropylene richer in $C_{13}$–$C_{15}$ polymers than a tetramer rich fraction, hydrofining this $C_{13}$–$C_{15}$ rich fraction to slightly increase its hydrogen content in the amount of 0.1 to 0.6 wt. percent, then alkylating benzene with the hydrofined polymers using $AlCl_3$ catalyst, and recovering an alkylate fraction formed by the alkylation.

References Cited in the file of this patent

UNITED STATES PATENTS

| | | |
|---|---|---|
| 2,488,145 | Smith et al. | Nov. 15, 1949 |
| 2,511,453 | Barry | June 3, 1950 |
| 2,542,970 | Jones | Feb. 27, 1951 |
| 2,620,361 | Karchmer | Dec. 2, 1952 |